US007389607B2

(12) United States Patent
Zwierski

(10) Patent No.: US 7,389,607 B2
(45) Date of Patent: Jun. 24, 2008

(54) FISHING ACCESSORY, IN PARTICULAR A LINE CUTTER

(75) Inventor: Sébastien Zwierski, Ronchin (FR)

(73) Assignee: Promiles, Villeneuve d'Ascq (FR)

( * ) Notice: Subject to any disclaimer, the term of this patent is extended or adjusted under 35 U.S.C. 154(b) by 0 days.

(21) Appl. No.: 11/167,602

(22) Filed: Jun. 28, 2005

(65) Prior Publication Data

US 2005/0284013 A1 Dec. 29, 2005

(30) Foreign Application Priority Data

Jun. 29, 2004 (FR) .................................. 04 07170

(51) Int. Cl.
*A01K 97/06* (2006.01)

(52) U.S. Cl. .............................. 43/25.2; 43/25; 43/57.1

(58) Field of Classification Search .................... 43/25, 43/25.2, 57.1; 30/296.1, 278, 280, 286, 287, 30/289, 290

See application file for complete search history.

(56) References Cited

U.S. PATENT DOCUMENTS

| | | | | |
|---|---|---|---|---|
| 44,389 | A * | 9/1864 | Blake | 30/296.1 |
| 309,028 | A * | 12/1884 | Byington | 43/25.2 |
| 326,794 | A * | 9/1885 | Shipley | 43/57.1 |
| 468,227 | A * | 2/1892 | Pflueger | 43/25.2 |
| 617,515 | A * | 1/1899 | Shine | 30/290 |
| 691,289 | A * | 1/1902 | Mckim | 30/296.1 |
| 734,544 | A * | 7/1903 | Hall | 43/25 |
| 740,339 | A * | 9/1903 | Tumelty | 30/290 |
| 870,033 | A * | 11/1907 | Hildreth | 43/25.2 |
| 911,117 | A * | 2/1909 | Crosier | 43/25.2 |
| 966,931 | A * | 8/1910 | Le Massena | 30/296.1 |
| 1,338,248 | A * | 4/1920 | Nelson | 30/290 |
| 1,531,725 | A * | 3/1925 | Baker | 43/25.2 |
| 1,543,120 | A * | 6/1925 | Mathias et al. | 43/57.1 |
| 1,601,945 | A * | 10/1926 | Davis | 43/25.2 |
| 1,662,983 | A * | 3/1928 | Pflueger | 43/25.2 |
| 2,028,477 | A * | 1/1936 | Rupp | 43/25.2 |

(Continued)

FOREIGN PATENT DOCUMENTS

FR 2579070 A * 9/1986

(Continued)

*Primary Examiner*—Darren W Ark
(74) *Attorney, Agent, or Firm*—Kenyon & Kenyon LLP

(57) ABSTRACT

The line cutter suitable for fitting to the body of a fishing rod is made as a single piece obtained by cutting out and stamping a metal plate. It comprises firstly a main body with a front portion, a rear portion, and two side portions, and secondly two longitudinal prongs extending the side portions of the main body rearwards. The plate is cut out and stamped in such a manner that, when the line cutter is mounted on the body of the fishing rod, the longitudinal prongs and at least the front portion of the main body are in contact with the body of the fishing rod, the rear portion of the main body being raised so as to allow the line to be pass thereunder, and in such a manner that between the rear portion of the main body and the longitudinal prongs, a cutout in the shape of an acute angle on one side defines a cutting zone, while on the other side there is provided a jamming zone for jamming the fishing line. The line cutter is secured to the body of the fishing rod by binding the longitudinal prongs to said body.

3 Claims, 1 Drawing Sheet

U.S. PATENT DOCUMENTS 2,094,107 A * 9/1937 Post .............................. 43/25
2,144,122 A * 1/1939 Pflueger ........................ 43/25
2,179,578 A * 11/1939 Monighan ................... 43/25.2
2,183,445 A * 12/1939 Conterman .................... 43/25
2,239,227 A * 4/1941 Gunnufson ................. 43/25.2
2,401,886 A * 6/1946 Shelton ...................... 43/57.1
2,424,419 A * 7/1947 Rosa .......................... 43/25.2
2,514,645 A * 7/1950 Jardine ....................... 43/25.2
2,514,929 A * 7/1950 Brandt .......................... 43/25
2,527,625 A * 10/1950 Fields ........................ 43/25.2
2,556,366 A * 6/1951 Miller ......................... 30/299
2,556,403 A * 6/1951 Sokolik ...................... 43/25.2
2,561,289 A * 7/1951 Paris ......................... 30/296.1
2,791,054 A * 5/1957 Gronek ....................... 43/25.2
2,821,042 A * 1/1958 Kneisel ......................... 43/25
2,825,992 A * 3/1958 Miller ........................ 43/25.2
2,833,075 A * 5/1958 Herron ....................... 43/25.2
2,943,414 A * 7/1960 Tussing ...................... 43/25.2
3,128,023 A * 4/1964 Cook ............................ 43/25
3,142,127 A * 7/1964 Mason ....................... 43/25.2
3,281,981 A * 11/1966 Dykhouse .................. 43/25.2
3,411,232 A * 11/1968 Rumbaugh .................. 43/25.2
3,418,742 A * 12/1968 Yaklyvich ................... 43/25.2
3,425,150 A * 2/1969 Braese ....................... 43/25.2
3,521,393 A * 7/1970 Gordon ...................... 43/25.2
3,545,119 A * 12/1970 Murnan ......................... 43/25
3,654,722 A * 4/1972 Camilleri ....................... 43/25
3,665,635 A * 5/1972 Lumbard .................... 43/25.2
3,763,589 A * 10/1973 Werner ....................... 43/25.2
3,815,273 A * 6/1974 Perkins ....................... 43/25.2
3,830,006 A * 8/1974 Garbolino ...................... 43/25
3,839,811 A * 10/1974 Hopkins ..................... 43/25.2
3,855,720 A * 12/1974 Dorph ........................... 43/25
3,971,151 A * 7/1976 Banner ....................... 43/25.2
3,990,148 A * 11/1976 Rienzo, Sr. ................ 30/296.1
4,003,153 A * 1/1977 Khalil ........................... 43/25
4,023,299 A * 5/1977 Maserang et al. .............. 43/25
4,067,134 A * 1/1978 Billings ...................... 43/25.2
4,156,983 A * 6/1979 Moore ........................... 43/25
4,291,461 A * 9/1981 Hansen ......................... 30/289
4,403,797 A * 9/1983 Ragland, Jr. ..................... 43/4
4,457,095 A * 7/1984 Stevenson ................... 43/25.2
4,648,197 A * 3/1987 Weiberg, Jr. ................... 43/25
4,660,314 A * 4/1987 Janssen et al. ................... 43/4
4,667,433 A * 5/1987 Thompson, Jr. .............. 43/25.2
4,726,140 A * 2/1988 Mears ........................... 43/25
4,730,409 A * 3/1988 Mitchell et al. .............. 43/25.2
4,796,372 A * 1/1989 Klein .............................. 43/4
4,823,498 A * 4/1989 Banta ............................ 43/25
4,896,422 A * 1/1990 Sheehan et al. ................ 43/25
D314,606 S * 2/1991 Banta ........................ D22/149
5,025,585 A * 6/1991 Powell .......................... 43/25
D325,240 S * 4/1992 Ellis .......................... D22/149
5,136,744 A * 8/1992 Allsop et al. ..................... 43/4
5,172,509 A * 12/1992 Motovik ..................... 43/25.2
5,182,874 A * 2/1993 Powell .......................... 43/25
5,197,217 A * 3/1993 Browning ........................ 43/4
5,247,760 A * 9/1993 Lowry ........................... 43/25
5,263,276 A * 11/1993 Washington ................ 43/25.2
5,385,569 A * 1/1995 Swor .......................... 606/148
5,448,851 A * 9/1995 Nyberg ....................... 43/25.2
5,557,874 A * 9/1996 Pietrandrea et al. .............. 43/4
5,682,704 A * 11/1997 Trent .......................... 43/25.2
5,685,037 A * 11/1997 Fitzner et al. .................... 43/4
5,960,504 A * 10/1999 Dougherty ....................... 43/4
6,026,607 A * 2/2000 Bukowski ........................ 43/4
6,029,387 A * 2/2000 Swor .......................... 43/57.1
6,061,858 A * 5/2000 Shepard ........................... 43/4
6,322,112 B1 * 11/2001 Duncan ........................... 43/4
6,679,199 B2 * 1/2004 Bankston ......................... 43/4
6,702,339 B1 * 3/2004 Geozalian ........................ 43/4
6,715,804 B2 * 4/2004 Beers .............................. 43/4
6,851,215 B2 * 2/2005 Conrad ............................ 43/4
2002/0073608 A1 * 6/2002 Broberg ...................... 43/57.1
2003/0126964 A1 * 7/2003 Ortega et al. .................. 30/280
2006/0168873 A1 * 8/2006 Johnson et al. .............. 43/25.2

FOREIGN PATENT DOCUMENTS

JP 2004-166618 A * 6/2004
JP 2004-201517 A * 7/2004
PT 95501 A * 7/1992

* cited by examiner

FISHING ACCESSORY, IN PARTICULAR A LINE CUTTER

The present invention relates to a fishing accessory suitable for fitting to the body of a fishing rod, in particular a fishing rod having a reel. The invention relates more particular to a fishing accessory suitable for being used to cut a fishing line, and possibly also for temporarily holding a fish hook.

BACKGROUND OF THE INVENTION

A line cutter suitable for fitting to the body of a fishing rod is known from U.S. Pat. No. 4,730,409. That accessory comprises a cutter blade that is sandwiched between two plates that are fixed to each other. One of the two plates is secured to an open semicylindrical part for enabling the accessory to be fitted on the body of the fishing rod by receiving it. Access to the cutter blade takes place via a notch formed in the two assembled-together plates. On either side of the notch, the plates are curved towards the inside of the notch, thereby enabling the fish hook to be held temporarily.

That accessory nevertheless presents drawbacks. The two assembled-together plates and the blade are mounted radially relative to the body of the fishing rod and can thus occupy space greater than the diameter of said body. This can be awkward for the user. Manufacture is necessarily complex, requiring several parts to be made and then assembled together. In addition, when it comes to cutting a fishing line, as shown in FIG. 6 of that document, it requires the user to establish the tension needed for cutting by holding the fishing line in both hands.

OBJECT AND SUMMARY OF THE INVENTION

The object of the present invention is to propose a line cutter suitable for fitting to the body of a fishing rod, that mitigates the drawbacks of the line cutter known from above-mentioned U.S. Pat. No. 4,730,409.

This object is well achieved by a line cutter that is made as a single piece, obtained by cutting out and stamping a metal plate. The line cutter comprises firstly a main body with a front portion, a rear portion, and two side portions, and secondly two longitudinal prongs extending the side portions of the main body rearwards. In addition, the plate is cut out and stamped in such a manner that when the line cutter is mounted on the body of a fishing rod, the longitudinal prongs and at least the front portion of the main body are in contact with the body of the fishing rod, the rear portion of the main body being raised to enable the line to be passed thereunder. Between the rear portion of the main body and the longitudinal prongs, and on one side a cutter forms an acute angle forming a cutting zone, while on the other side there is provided a zone for jamming the fishing line. Finally, the line cutter can be secured to the body of the fishing rod by binding or whipping the longitudinal prongs to the body.

Thus, in a particular disposition of the present invention, the line cutter is practically integrated on the outside surface of the body of a fishing rod, projecting therefrom over a height that is very small, of the order of a few millimeters. In addition, in order to cut a line, it suffices for the user to make a circular movement causing the line to pass under the rear portion of the main body while bringing it firstly into the jamming zone and then into the cutting zone, and then to pull the line upwards once it has become blocked in the jamming zone in order to cut it in the cutting zone.

In a variant embodiment, the jamming zone is also defined by an acute-angled cutout between the rear portion of the main body and the other longitudinal prong. This version is particularly suitable for fishing lines of the braided type which, when compared with monofilament type lines, are larger in diameter and less slippery.

In another variant embodiment, the jamming zone is obtained by folding a flap onto the longitudinal prong, which flap is either connected to said prong or else to a side portion of the central body. Thus, when the user makes the circular movement, it suffices to pass the fishing line under the flap and under the raised rear portion in order to jam the line between said flap and the longitudinal prong and then to cut the line as before by pulling it upwards in the cutting zone. This embodiment is particularly suitable for monofilament type fishing lines where the line is jammed between two contacting surfaces, one belonging to the flap and the other to the longitudinal prong.

In a variant embodiment, the main body has its central portion both pierced by a hole and raised relative to the front portion. In this variant, it is possible for the user to insert the end of the fish hook in the hole in the central body, with the barb then being received under the main body, and thus not being directly accessible. This presents another advantage compared with the accessory of U.S. Pat. No. 4,730,409 in its use for temporarily holding the fish hook.

In a variant embodiment, the longitudinal prongs are interconnected by at least one spacer which is curved to a circularly arcuate shape in the operation of stamping the plate to shape the accessory. The presence of the spacer enables the spacing between the two side prongs to be kept constant and thus avoid any deformation of the jamming and cutting zones while the accessory is being put into place on the body of the rod. The spacer also improves the retention of the line cutter on the body of the fishing rod while the longitudinal prongs are being bound, by limiting its ability to slide.

BRIEF DESCRIPTION OF THE DRAWINGS

The present invention can be better understood on reading the following description of two embodiments of a line cutter for mounting on the body of a fishing rod, the line cutter being made as a single piece obtained by cutting out and stamping a metal plate, and both embodiments being shown in the accompanying drawing, in which.

MORE DETAILED DESCRIPTION

The fishing accessory described below can perform two functions, that of a line cutter and that of means for temporarily holding a fish hook. In each of these two functions, the accessory presents significant advantages. As a line cutter, it fits in well with the natural actions of the user, and in particular it can be used with the left hand while the user is holding the rod in the right hand, or possibly the other way round. While temporarily holding the fish hook, it avoids any risk of injury since the barb is completely inaccessible.

Figure 1:
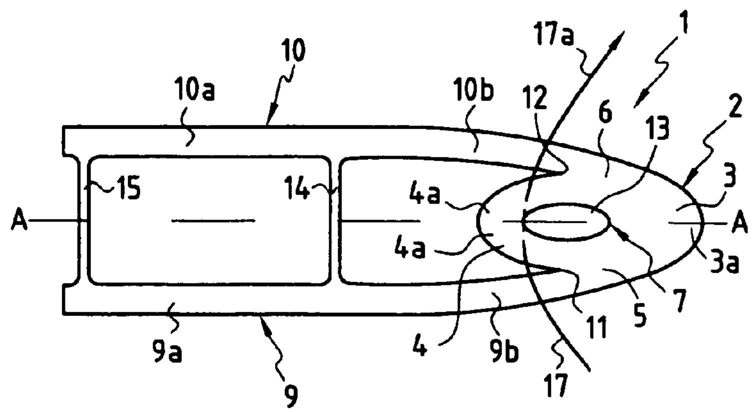
FIG. 1 is a diagrammatic plan view from above of a metal plate the has been cut out and prior to being stamped in order to form a first embodiment of a line cutter.
Figure 2:
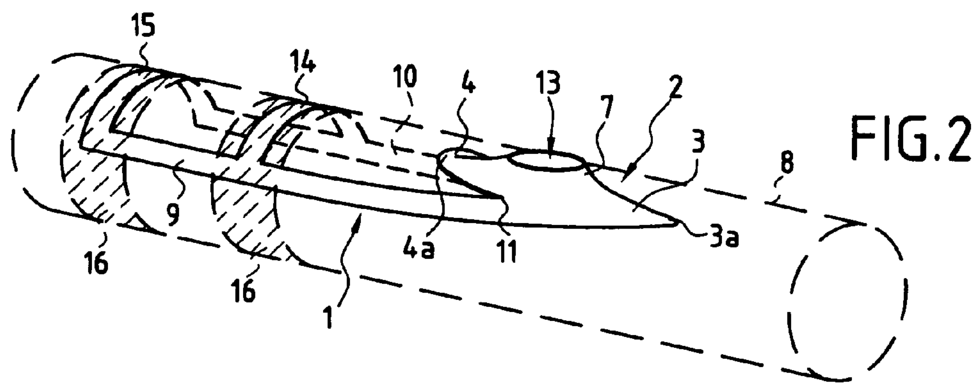
FIG. 2 is a diagrammatic perspective view of the first embodiment of the line cutter after it has been stamped.

FIGS. 1 and 2 show a first embodiment of the accessory 1 that is made by cutting out and stamping a thin metal sheet, e.g. of stainless steel and of the type having a thickness of 0.2 millimeters (mm). The stamping that takes place after cutting out serves to give the various portions constituting accessory 1 their three-dimensional shape.

More precisely, the accessory comprises firstly a main body 2 which is generally oval in overall shape, having a front portion 3, a rear portion 4, and two side portions 5 and 6, which portions surround a central portion 7. The main body 2 and also the accessory as a whole in this first embodiment, are symmetrical about a longitudinal plane A-A which, when the accessory 1 is put into place on the body 8 of the fishing rod, also corresponds to the longitudinal plane of said body.

The terms "front" and "rear" are used relative to the direction taken up by the accessory when it is in place on the body 8 of the fishing rod.

The accessory 1 also has two longitudinal prongs 9 and 10 which extend rearwards from the two side portions 5 and 6 of the main body 2.

The longitudinal prongs 9 and 10 comprise mutually parallel rear rectilinear portions 9*a* and 10*a* which converge towards the side portions 5 and 6 of the main body 2 via slightly curved portions 9*b* and 10*b*.

Where the curved portions 9*b* and 10*b* of the longitudinal prongs 9 and 10 join the side portions 5 and 6, the cutouts in the metal plate form acute angles 11 and 12 which constitute a jamming zone on one side and a cutting zone on the other side, depending on the direction in which the accessory 1 is used by the user.

The central portion 7 of the main body 2 is pierced by a hole 13 which, in the example shown, is likewise oval in shape, but which could be off-center relative to the main body 2, being closer to the rear edge 4*a* of the rear portion 4 than to the front edge 3*a* of the front portion 3.

The two longitudinal prongs 9 and 10 are connected together in their rectilinear rear portions 9*a* and 10*a* by two spacers 14 and 15.

As mentioned above, the accessory 1 comprises a single piece, being obtained from a single metal plate by cutting out and stamping. The cutting-out tool is designed to produce the various portions the above-described configuration all lying in a single plane. Stamping then gives the accessory its three-dimensional configuration, serving above all to make it easy to fit against the cylindrical body 8 of a fishing rod, as shown in dashed lines in FIG. 2.

Stamping therefore gives the accessory overall circularly arcuate curvature about the plane of symmetry A-A, as shown in FIG. 2. Contact between the accessory 1 and the cylindrical body 8 of the fishing rod is provided via the two longitudinal prongs 9, 10, the spacers 14, 15, and also the edge 3*a* of the front portion 3 of the main body 2. However the edge 4*a* of the rear portion 4 of the main body 2 is raised slightly relative to the cylindrical body 8 of the fishing rod so as to enable the fishing line to be inserted under said rear portion 4 and into the jamming zone 11 and the cutting zone 12 by performing a circular movement as represented in FIG. 1.

In addition, the middle portion 7 with its top hole 13 is also raised above the cylindrical body 8 so as to leave an inside space between the hole 13 and the edge 3*a* of the front portion 3, which space extends between the main body 2 and the cylindrical body 8 of the rod and can be used for receiving the end of a fish hook that includes the barb.

It should be observed that the accessory 1 is not strictly restricted to being used with a fishing rod whose body possesses some particular diameter, exactly matching the curvature given to the accessory 1 while it is being stamped. Because the accessory is thin, it possesses a degree of flexibility, in particular via its spacers 14 and 15, thus enabling it to be fitted to rods of different diameters.

Once pressed against the surface of the cylindrical body 8 of the rod, extending along the longitudinal direction thereof as shown in FIG. 2, the accessory is secured by binding the longitudinal prongs 9, 10, in particular by means of adhesive tape 16, e.g. over the spacers 14 and 15.

It has been found that the best position for the accessory on the cylindrical body of the fishing rod is immediately after the handle of the rod (or the zone of the rod that is used as a handle), and that the accessory should be disposed slightly obliquely, at an angle of about 45°.

If the plane A-A of symmetry of the accessory is considered, then that plane should be inclined relative to a vertical plane containing the longitudinal axis of the cylindrical body 8 of the rod when in its normal in-use position.

It should be inclined to the left if the user holds the rod in the right hand, and conversely to the right if the user holds the rod in the left hand.

The fishing line 17 is inserted by the user under the raised edge 4*a* of the rear portion 4 of the main body 2 by performing a circular movement so that the fishing line 17 is received under the rear portion 4 until it reaches the acute-angled cutouts between the rear portion 4 and the longitudinal prongs 9, 10.

By pulling the end 17*a* of the line 17 that the user is holding in the hand in an upward direction, this end 17*a* is cut because of the presence of cutting edges in the plate in the acute angle which acts as a cutting zone 12.

This cutting can be achieved because the fishing line is held in position and prevented from sliding by the acute-angled cutout of the jamming zone 11.

This first embodiment in which the jamming zone 11 is constituted by the acute-angled cutout between the rear portion 4 and the other longitudinal prong 9 is particularly well suited to a fishing line having a surface state that enables it to be jammed at a single point, as applies more particularly to braided type lines.

Figure 3:
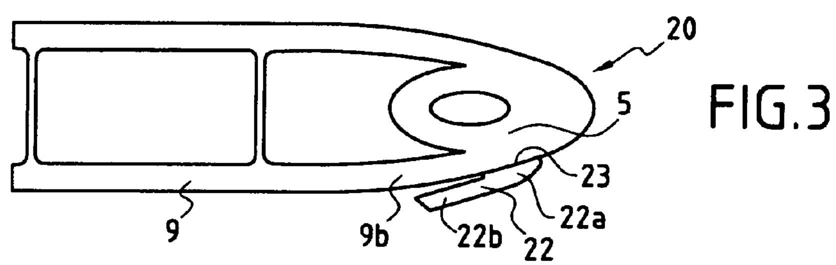
FIGS. 3 and 5 are diagrammatic plan views from above of a cutout metal plate prior to being stamped for second and third embodiments of a line cutter having a jamming flap connected to the longitudinal prong (FIG. 3) and to the side portion of the central body (FIG. 5)
Figure 4:
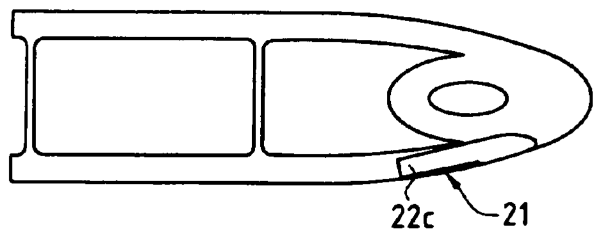
FIG. 4 shows the FIG. 3 plate after said flap has been folded down.

The second embodiment described below and shown in FIGS. 3 and 4 is more particularly adapted to smooth lines, in particular of the monofilament type, having a surface state that is more slippery and for which jamming requires contact over an area.

In this second embodiment, the accessory 20 differs from the accessory 1 of the first embodiment solely in the configuration of the jamming zone 21 which is now constituted by a zone extending between one of the longitudinal prongs 9 and a flap 22.

When the metal plate constituting the accessory 20 is cut out, a flap 22 is formed that constitutes a kind of projection from the curved portion 9*b* of the longitudinal prong 9 where it joins the side portion 5 of the main body 2.

As can be seen clearly in FIG. 3, the flap 22 has a front portion 22*a* which is thus connected to the side prong 9, and a rear portion 22*b* which is rectilinear and which is immediately adjacent to the longitudinal prong 9.

In order to make the jamming zone 21, the metal plate as cut out in this way is folded about a fold line 23 corresponding to the junction between said flap 22 and the longitudinal prong 9 so as to bring the flap 22 down onto the top face of the longitudinal prong 9.

Preferably, the rear edge 22*c* of said flap 22 is raised so as to make it easier to insert the fishing line 17 into the jamming zone 21.

Figure 5:
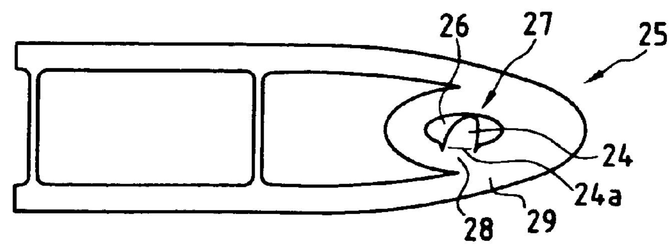

The third embodiment shown in FIG. 5 differs from the second only in the location of the flap 24. When cutting out the metal plate constituting the accessory 25, the flap 24 is constituted by a projection from a side portion of the main body towards the inside of the hole 26. As can be seen in FIG. 5, the flap 24 is connected to the side portion 28 via a fold line 24*a*.

To make the jamming zone, the metal plate is folded about the fold line 24*a* so as to bring said flap 24 down onto the top face of the longitudinal prong 29.

What is claimed is:

1. A fishing rod in combination with a line cutter, comprising: a body of the fishing rod, a line cutter fitted onto the body of the fishing rod, the line cutter being formed as a single piece that is obtained by cutting out and stamping a metal plate, the line cutter comprising a main body with a front portion, a rear portion, and two side portions, and two longitudinal prongs rearwardly extending from the side portions, the two longitudinal prongs are interconnected by at least one spacer which is located behind and spaced from the rear portion of the main body, the at least one spacer extending generally transverse to the two longitudinal prongs, an open space is defined between the two longitudinal prongs and between the rear portion of the main body and the at least one spacer, the longitudinal prongs and at least the front portion of the main body coming into contact with the body of the fishing rod, the rear portion of the main body raised so as to allow the line to be passed thereunder, a cutting zone located proximate to one of the two side portions being constituted by an acute angled formed between one of the longitudinal prongs and the rear portion of the main body, and a jamming zone located proximate to the other of the two side portions being constituted by another acute-angle formed between the other of the longitudinal prongs and the rear portion of the main body, the line cutter fastened to the body of the fishing rod by binding rear rectilinear portions of the longitudinal prongs.

2. A fishing rod according to claim 1, wherein the at least one spacer which, during the stamping, is curved to a circularly arcuate form.

3. A fishing rod according to claim 1, wherein the main body of the line cutter has a central portion pierced by a hole and raised relative to the front portion so as to serve as a temporary housing for receiving an end of a fish hook that includes a barb.

* * * * *